Dec. 31, 1940.  R. PATERAS PESCARA  2,226,978
SYSTEM INCLUDING ROTARY BLADES
Filed Feb. 6, 1935   7 Sheets-Sheet 1

INVENTOR:
RAUL PATERAS PESCARA

Dec. 31, 1940. R. PATERAS PESCARA 2,226,978
SYSTEM INCLUDING ROTARY BLADES
Filed Feb. 6, 1935 7 Sheets-Sheet 3

INVENTOR:
RAUL PATERAS PESCARA:

by Bailey & Hanson
Attys.

Dec. 31, 1940. R. PATERAS PESCARA 2,226,978
SYSTEM INCLUDING ROTARY BLADES
Filed Feb. 6, 1935 7 Sheets-Sheet 6

INVENTOR:
RAUL PATERAS PESCARA:
by Bailey & Larson
attys:

Dec. 31, 1940.   R. PATERAS PESCARA   2,226,978
SYSTEM INCLUDING ROTARY BLADES
Filed Feb. 6, 1935   7 Sheets-Sheet 7

INVENTOR:
RAUL PATERAS PESCARA:
by Bailey & Larson
attys.

Patented Dec. 31, 1940

2,226,978

UNITED STATES PATENT OFFICE 2,226,978

SYSTEM INCLUDING ROTARY BLADES

Raul Pateras Pescara, Paris, France

Application February 6, 1935, Serial No. 5,260
In France February 6, 1934

37 Claims. (Cl. 244—6)

The present invention relates to systems including rotary blades such as supporting systems, propelling systems, power generating systems (wind engines), etc., and it is more especially, although not exclusively, concerned with systems of this kind for use in connection with aircrafts.

The object of the present invention is to provide a system of the kind above referred to which is better adapted to meet the requirements of current practice than systems of this kind used up to this time, especially with a view to reducing the fatigue of the structural elements of the system (due to bending and torsional stresses) and to improving the efficiency and the range of adaptation of machines or apparatus including systems of this kind.

The essential feature of the present invention consists in constituting the blades of these systems, and especially the rotary wings of some types of flying machines, with elements which are wholly supple in the direction of their length, and along at least a portion of said length, said elements being adapted to become rigid, when rotating, in a position of equilibrium determined by the combined action of the centrifugal forces and of the aerodynamic forces.

Another feature of the present invention consists in making use of the supple structure of said blades for making it possible to vary at will their active length, and consequently the area swept over by said blades. This result is obtained through suitable means permitting for instance to wind or unwind the blades, or again to fold or unfold them. Advantageously, in the case of the blades being used in connection with aircrafts, the blades or variable area thus constituted are combined with stationary supporting surfaces.

Another feature of the present invention consists in combining with said blades means for varying at will their inclination with respect to the plane in which they rotate.

Still another feature of the invention consists in providing said blades with a frame consisting substantially of a system of cables.

Finally, still another feature of the invention consists in constituting these supple blades of a fluidtight envelope capable of being made rigid, at least in the transverse direction, by the pressure of a gas which either fills the space inside said envelope or flows in a continuous manner through said space.

Other features of the present invention will result from the following detailed description of some specific embodiments thereof.

Preferred embodiments of the present invention will be hereinafter described with reference to the accompanying drawings, given merely by way of example, and in which.

The invention is especially applicable to flying machines provided with rotary blades, said blades being either driven in a continuous manner by an engine (case of helicopters) or by reaction, or turning freely under the action of the relative wind (case of gyroplanes); But the invention should not be considered as limited to this type of machines.

It should first be noted that a system of wings of the type above referred to made according to known principles has the disadvantage of having its structural elements subjected to bending stresses which are particularly dangerous because their alternation may produce the crystallization of the materials or set up a resonance capable of breaking the blades.

An important improvement, described in Spanish Patent No. 65,076, has been provided for systems of wings of the kind above mentioned. This improvement consists in pivotally connecting the blades to their hub in such manner as to leave them free to assume the position of equilibrium resulting from the combined actions of the centrifugal and aerodynamic forces on said blades. Although the bending stresses are thus considerably reduced, since the blades are free to assume variable relative positions, these stresses are not wholly eliminated, because of the rigidity of the blades.

According to the present invention, and especially in order to obviate the drawbacks that have been just above mentioned, the blades of the systems of wings are made of elements which are fully supple (and not only flexible) in the direction of their length and along at least a portion of said length, said elements being adapted to become rigid, when revolving, in a position of equilibrium, under the action of the centrifugal and aerodynamic forces.

Preferably, and as it will be assumed in the following description, said elements are so devised as to be fully supple, so as to obtain, when the blades are revolving, not only a general equilibrium but an elementary equilibrium, said equilibrium being determined merely by the external forces (centrifugal force and aerodynamic force) and by the tensile forces, any bending stresses being eliminated.

I have found that, in order to make a blade which complies with these conditions, it is advantageous to make use of a structure including, on the one hand a frame which is more especially intended to resist the tensile stresses that balance the action of the external forces, and, on the other hand, an envelope, also supple, which is supported by said framework, and which is given a suitable shape according to the desired cross sectional shape of the blade when the latter is working.

However, it should be well understood that this arrangement is not a necessary feature of the present invention which also includes the case in which the framework and its envelope would be made as a single piece of a suitable supple material capable of resisting in a satisfactory manner the tensile stresses.

According to the first mentioned embodiment, the framework consists, for instance of at least one set of cables 1 (eventually several such sets), preferable made of metal. It should be noted that the word cable is to be taken in its most general meaning, including bands, ribbons, wires, etc.

This system of cables is so devised that cables 1 are fixed at one end, on the side nearest to the axis 0 about which the rotary blades are pivoted, to a corresponding piece or part 2 of the hub of said blades.

Figure 1:
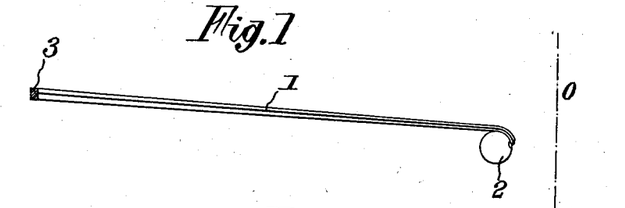
Fig. 1 is an elevational view of a thin blade for rotary aircraft wings made according to the present invention.
Figure 2:
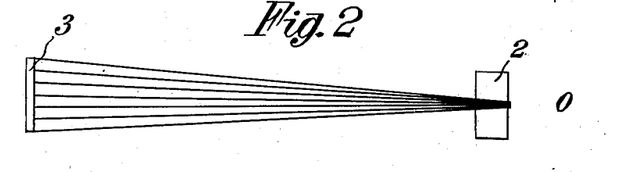
Figs. 2 and 3 are a plane view and a cross sectional view, respectively, of the blade shown in Fig. 1.

These cables 1 run in the direction of the length of the blade and are disposed, for instance, either radially with respect to axis 0 (Figs. 1 and 2), or parallelly to one another (other figures).

In this way I obtain a system which, even if considered independently of the envelope which will be hereinafter described, is subjected, in the rotary movement of the blade, to the action of the centrifugal force, due to its own weight, and therefore tends to assume a position of equilibrium away from axis 0.

Of course means are provided for giving this structure a suitable rigidity.

Figure 5:
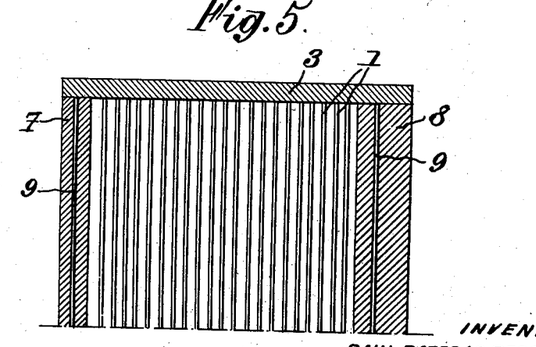
Fig. 5 is a plan view corresponding to Fig. 4.
Figures 6, 7:
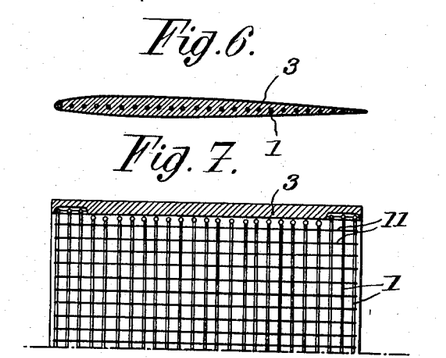
Fig. 6 is a cross sectional view of a blade of the same kind made according to another embodiment.
Fig. 7 is a plan view of the blade shown in Fig. 6.

These means may, for instance, merely include a rigid or semi-rigid piece 3 extending transversely to said cables 1 and to which the free ends of said cables are fixed, said piece being preferably made heavy enough in order that the centrifugal force it develops may be added to that resulting from the weight of the set of cables 1 (Figs. 2, 5, 7 and 9). Eventually, I may fix to said piece 3 only the extreme cables of the system of cables, as shown by Fig. 7.

But it may be advantageous to further increase the transverse rigidity of the framework.

For this purpose I may, according to an embodiment not shown in the drawings, provide along the blade one or several ribs similar to piece 3, which serve to connect the different cables together.

I may also provide transverse cables 4 along cables 1, in which case the framework consists of a kind of trellis-work structure. It may even consist of a metal cloth or fabric.

Any structure increasing rigidity in the transverse direction of the blade without reducing suppleness in the longitudinal direction may be employed.

The envelope to be carried by this framework may be made in different ways.

Figure 3:
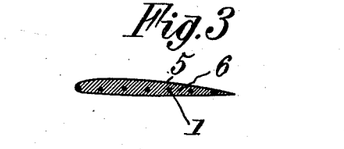

In the case of a blade of flat shape the envelope may be obtained by covering the framework, for instance on the upper and the under side thereof, with a suitable fabric structure (Fig. 3). Eventually, a resilient filling matter (india rubber for instance) may be interposed between the upper and under faces of said envelope.

In the case of relatively thick blades, the structure is somewhat similar, but it is advantageous to provide, along the leading edge and the trailing edge of the blade, elements 7 and 9 arranged to give said edges the desired shape, said elements being supple in the longitudinal direction and having a certain rigidity in the transverse direction. Elements 7 and 8 are for instance made of a stiff fabric or india-rubber and they are eventually reinforced by cables such as 9.

The space between the upper and under faces of the blade is filled with a matter 6 which is both plastic and light, such for instance as sponge-like rubber. This matter bears, at the free end of the blade, against transverse piece 3, which will thus support most, or even the whole, of the resultant of the centrifugal forces acting on said matter 6, and will transmit it to the system of cables 1.

Advantageously, this filling material 6 will be engaged in grooves 10 provided in elements 7 and 8.

In the case of a thick blade of this kind, the framework may consist either of a single system of cables provided either along the upper face of the blade or along the under face thereof, or of two sets of cables disposed along said faces of the blade, respectively. But my device is not limited to these arrangements.

According to another embodiment, which is particularly advantageous, I provide an envelope 11 (Figs. 8 to 11) made of a fluidtight supple material, either coated with varnish or not, such for instance as rubberized cloth, inside which a certain gas pressure is ensured.

Figure 8:
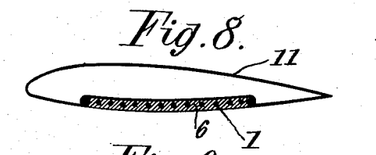
Fig. 8 is a cross sectional view of a blade adapted to be inflated by means of air, according to the present invention.
Figure 9:
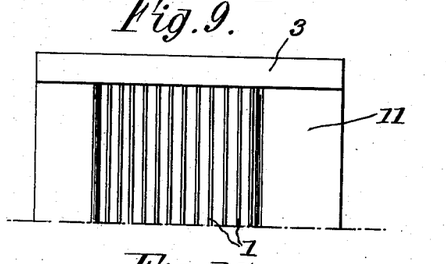
Fig. 9 is a plan view of the blade shown in Fig. 8.

For this purpose, a certain amount of gas, air for instance, is enclosed at a suitable initial pressure in said envelope which is to be so devised as to prevent any leakage of air (Figs. 8 and 9).

Figures 10, 11:
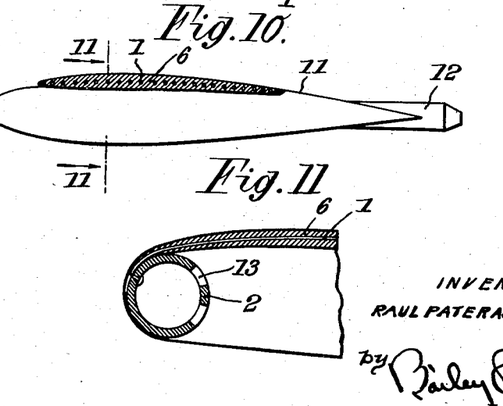
Fig. 10 is a cross sectional view of a blade made according to a modification of the embodiment of Figs. 8 and 9.
Fig. 11 is a longitudinal sectional view of the combination of a blade of the kind of that shown by Fig. 10 with a device for carrying and inflating said blade, according to the present invention.

Alternately, air is caused to flow in a continuous manner through the envelope, said air being, for instance fed from the hub and issuing through at least one nozzle 12 which is suitably positioned (Figs. 10 and 11).

This gas pressure will give the blade the necessary transverse rigidity, eventually in combination with framework 1, which may be either fixed to said envelope, or free with respect thereto, both elements (the framework and the envelope) being preferably, in either case, fixed to piece 3.

Furthermore, the framework may be disposed either on the inside of the envelope, or, as shown in Figs. 8 and 10 on the outside thereof, advantageously against the upper or the under face thereof, so as to leave the inside of the blade wholly unobstructed and not to brake the flow of air, when air flows throughout the blade.

Finally, the framework may be wholly surrounded by a suitable matter 6.

When air is caused to flow continuously throughout the blade, the piece that carries the blade may consist of a hollow cylinder 2 to which air is fed from a source of pressure provided in the aircraft. The cables 1, on the one hand, and the envelope, on the other hand, are fixed to said cylinder. Air is admitted into the blade through openings 13 provided in said cylinder, and it escapes from said blade through any suitable outlet means, for instance nozzle 12 (Fig. 11).

Finally, whatever be the specific structure of the blade, the whole is so devised, or means are so arranged, that said blade has a suitable angle of incidence when revolving. This result can be obtained in various ways. For instance I may provide on some elements, and especially on the leading and trailing edges of the blades, one or several masses fixed either at intermediate points of the length of the blade or at the end thereof, said masses being so arranged and calculated that the centrifugal forces acting thereon tend to give the blade a suitable relative position and, at the same time, to increase the rigidity thereof.

With an arrangement such as above described, when no force is acting on the blades, as the latter are fully supple, they can be folded up in any suitable manner, and eventually they may be fixed in a position of rest through any suitable means. As soon as the blades are caused to revolve, they are moved away from the axis of revolution and they tend to become rigid in a position of equilibrium, under the combined actions of the centrifugal and aerodynamic forces.

A system of wings of this kind possesses, over the usual systems of wings used, for instance in gyroplanes and helicopters, up to this time many advantages, and especially that of eliminating any bending stresses.

The advantages obtained according to the present invention as above described are considerably increased when use is further made of the arrangements that will be hereinafter described and which are intended to increase the efficiency and the possibilities of use of rotary blades systems of the kind above mentioned (whatever be their application). In particular when said systems are used in aviation the arrangements that will be hereinafter described make it possible to create new types of apparatus which can be given high speeds of translation while keeping the advantage of taking off or landing vertically or obliquely at relatively low speeds. Furthermore the space occupied by these apparatus when not in use are considerably reduced.

In existing flying machines the supporting surfaces of which consist of, or include, rotary blades, the latter permit of improving the conditions under which the machines take off or land, provided that the area swept over by said blades is considerable. But when the machine is flying normally, the area swept by the revolving blades is much too large, which brakes the flying machine. It follows that, up to the present time, machines of this kind could not fly at high speeds.

The ratio of lift and drag with supporting surfaces of this kind is always rather bad and consequently these systems are not very widely used, despite the undeniable advantages they possess from the point of view of easy taking off and landing and safety in flight.

On the other hand, with fixed supporting surfaces the best ratio of the components above mentioned is always higher than with revolving supporting surfaces, but, in the case of flying machines provided with said fixed supporting surfaces, these high ratios (which correspond to loads per square meter of supporting area as high as several hundreds of kilogrammes) cannot usually be taken advantage of, in view of the difficulty of taking off and landing, or because they would make it impossible to reach high altitudes.

Furthermore, the systems of revolving blades existing at the present time, whatever be their applications, are not, as a rule capable of adapting themselves to variations of velocity and density of the medium in which they are moving or the velocity of which they are utilizing.

In order to obviate these drawbacks, according to the present invention, the systems of revolving blades or wings consist of supple blades of the kind above described. Furthermore these blades are so connected to their hub that it is possible to vary their active surface, and consequently the area swept over by said blades, within wide limits, and, if need be, between zero and a maximum area. This variation is performed either automatically or manually, either as a function, for instance, of the velocity of the wind in the case of wind engines, or as a function of the speed of relative movement, in the case of revolving blades for flying machines, as it will be hereinafter assumed.

Figures 12, 13:
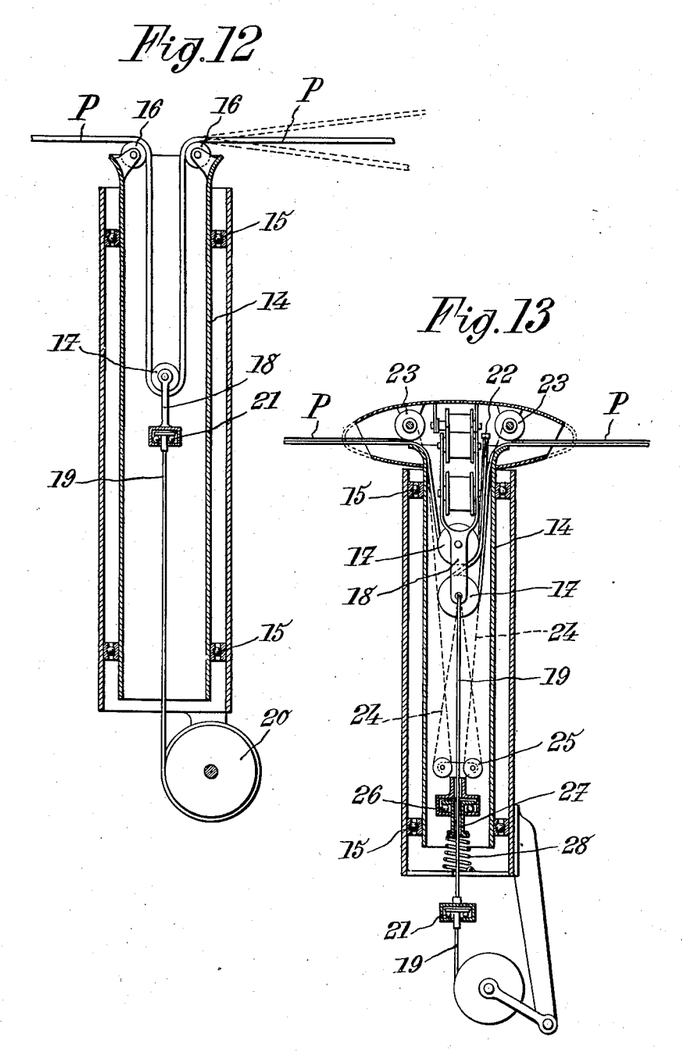
Fig. 12 is a diagrammatic sectional view of the combination of a rotary wing system having supple blades, its hub, and means for permitting to vary the length of said blades, according to the present invention.
Fig. 13 is also a sectional view showing a combination of the same kind, in the case of thick blades, according to another embodiment of the invention.

In order to obtain this result I may cause a portion of variable length of said blades to be pulled inside the hub of the system of revolving blades, for instance as shown in Fig. 12.

Figures 19, 20, 21:
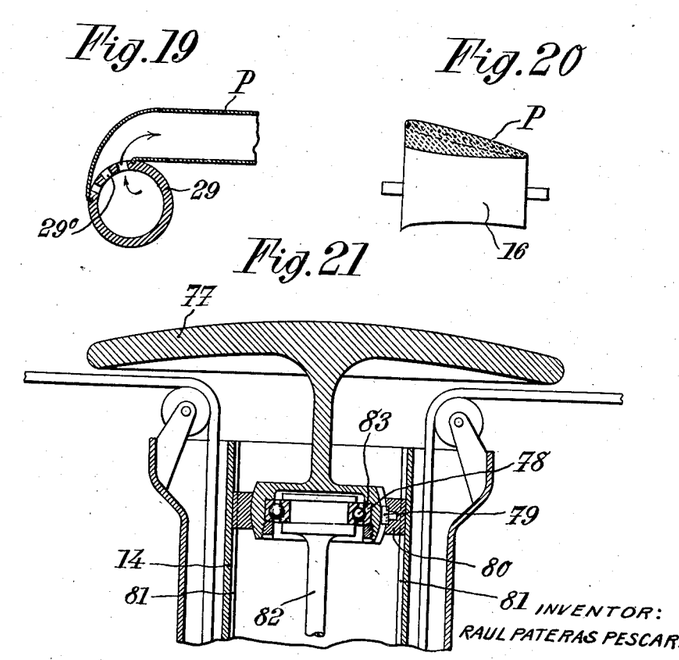
Fig. 19 is a partial longitudinal section of a combination of a blade of the same type with a device for folding up and inflating the blades made according to another embodiment.
Fig. 20 is a sectional view of a supple blade which can be given a variable angle of incidence, according to the present invention.
Fig. 21 shows, in section through the axis of a system of rotary wings having supple blades, a device for twisting the blades, according to the invention.

I may also provide said hub with drums about which can be wound up or unwound said blades, that is to say the whole of their framework and their envelope (Fig. 19).

Figure 17:
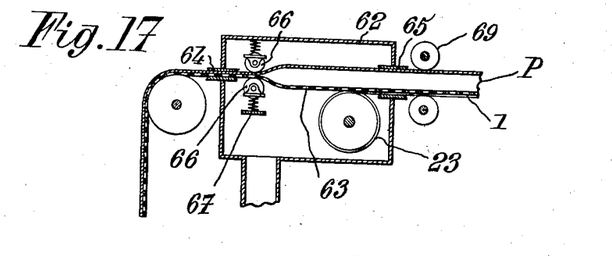
Fig. 17 is a diagrammatic sectional view of a device for folding up and inflating a blade of the kind of that shown by Fig. 10.

Both of these devices may also be combined, the envelope of the blade being for instance pulled inside the hub while the framework is wound or unwound around a drum (Figs. 13 and 17).

Both of these elements, envelope and framework might also be wound or unwound around different drums respectively.

Furthermore, according to a particularly advantageous arrangement, the folding or unfolding of the blades is controlled in such manner as to be produced by the revolving movement of said blades themselves.

With this arrangement, the unfolding of the blades preferably takes place under the effect of the centrifugal force acting on said blades and tending to pull them outwardly. The folding or winding up of the blades takes place through means for combining this movement with the rotary movement of the hub or rotor that carries said blades, through the medium of organs acting directly on the blades for performing the movement.

According to a first embodiment shown in Fig. 12, the hub 14 of the system, which is made hollow and which is journalled in stationary parts of said system, for instance through ball bearings 15, carries two blades P disposed in opposed relation with respect to each other and constituted by the same ribbon or band. This ribbon or band is caused to pass on the one hand around drums 16 carried by said hub, and, on the other hand, around a pulley 17 movable in the vertical direction inside the hub.

Said pulley is for instance carried by a supporting member 18 secured at the end of cable 19. Cable 19 is adapted to wind or unwind on a drum 20 carried by a stationary part of the machine. This drum 20 can be driven either manually, through a suitable speed reducing gear including eventually a pawl or the equivalent, or through a motor which, as above stated, may consist of the rotor itself.

Between member 18, which turns together with the hub or rotor, and cable 19, there is interposed, for instance, a ball bearing 21.

This device has two disadvantages: First the hub must be relatively high (its height being at least equal to the length of the portion of the blade that is to be pulled in inside said hub; secondly the hub is subjected to a strong compression equal to the sum of the centrifugal forces acting on the blades.

These drawbacks may be obviated by making use of a device of the kind of that shown by Fig. 13. In this embodiment each blade is secured to the hub at 22 and it is caused to pass either around a single pulley 17 mounted in the same manner as pulley 17 of the preceding embodiment, or around the pulleys of a pulley block. In this case, the displacement of cable 19 is smaller than the corresponding longitudinal displacement of the blades (one-half thereof with the arrangement of Fig. 13).

The various pulleys 17 corresponding to the respective blades may be carried by a common support 18.

In Fig. 13 it has been assumed that the blades had a relatively thick outline or cross section, and that the framework of said blades was wound around drums 23, controlled in any suitable manner, independently of the envelope or body of the blade which is caused to pass around pulleys 17. For instance, the framework of each blade is advantageously disposed on the outside of the body of said blade, as it will be hereinafter explained with reference to Fig. 18).

Figure 4:
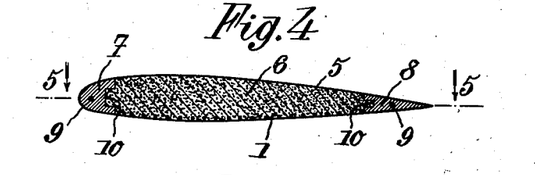
Fig. 4 is a cross sectional view of a thick blade made according to the present invention.

If these thick blades are provided with a filling material, for instance as above described with reference to Figs. 4 and 5, it may be advantageous to impose on said material a certain tension which cannot be supplied by the centrifugal force since said material butts against piece 3. Accordingly, I provide a connection between drums 23, around which the frameworks are wound, and movable member 18. This connection, for instance, is constituted by cables 24, which are fixed to said member 18 at one end, are wound around pulleys 25 carried, through ball bearings 26, by a support 27 subjected to the tension of a spring 27 secured to a stationary part of the machine, and are finally fixed, at their other ends to the peripheries or pulleys rigidly fixed to drums 23, in coaxial relation therewith, the last mentioned pulleys having a diameter equal to one half the diameter of drums 23.

Figures 14, 16:
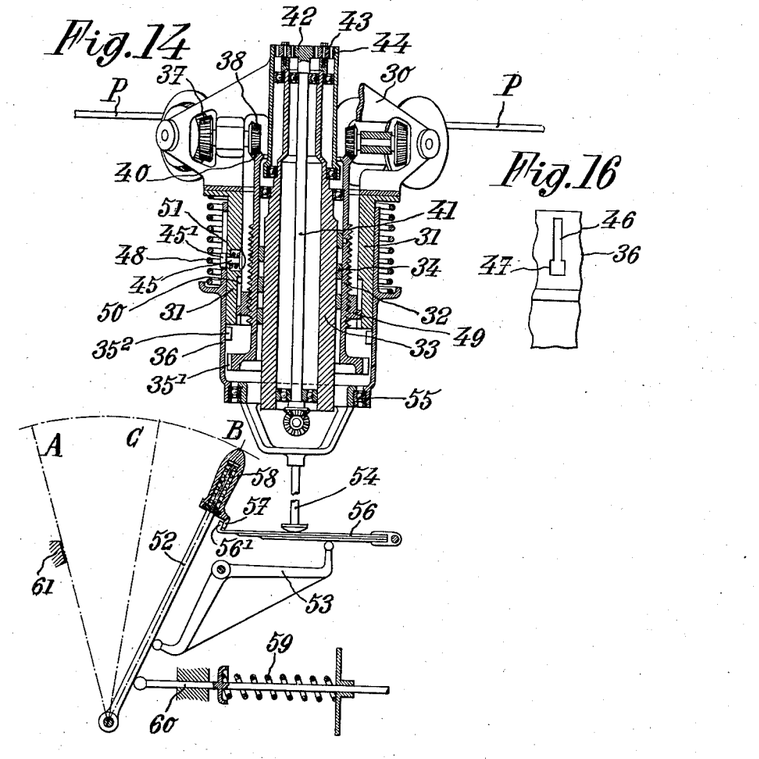
Fig. 14 is an axial sectional view of a device of the same kind made according to another embodiment of the invention.
Fig. 16 is a partial side view of an organ of the combination of Figs. 14 and 15.
Figure 15:
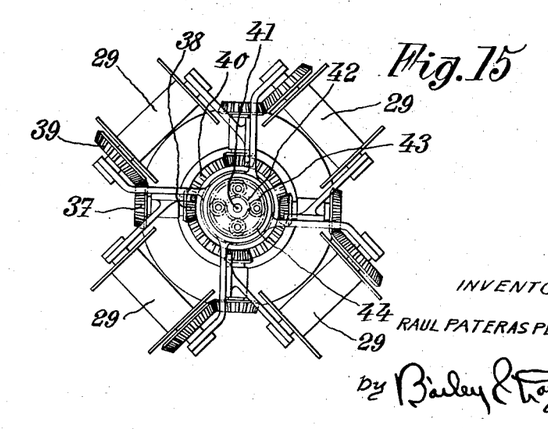
Fig. 15 is a plan view corresponding to Fig. 14.

In Figs. 14 to 16 I have shown an embodiment according to which blades P can be wound or unwound on respective drums 29 the spindles of which are journalled in a frame 30 integral or rigid with rotor 31.

In order to either permit said drums to turn freely so as to produce the unfolding of the blades under the effect of the centrifugal force, or cause said drum to turn in the reverse direction so as to wind up the blades, I make use of a device including a member, disposed preferably in coaxial relation with respect to the rotor and adapted to be connected, through suitable gears with the drums above referred to.

Said member is so devised as to be capable of:
(a) Either turning freely about its axis, in which case the drums can turn freely in their frame under the effect of the centrifugal force acting on the blades, which produces the unwinding of said blades;
(b) Or being immobilized, in which case a rotary movement is transmitted to the drums in the direction that causes the blades to be wound up around said drums;
(c) Or finally being driven together with the rotor in which case the drums are prevented from turning about their spindles and the blades remain in the position they have been given.

An embodiment of such an arrangement is shown in Figs. 14 to 16. The member above referred to consists of a sleeve 32 disposed between rotor 31 and a hollow shaft 33 fixed on the machine and carrying the whole.

This sleeve 32 can either turn freely about its axis, or be fixed to shaft 33 through a clutch 34, or finally be driven by the rotor, for instance through a system of sliding dogs, some of which 35¹ are carried by sleeve 32, while the others 35² are carried by a member 36 which is arranged to rotate together with the rotor and is capable of sliding with respect thereto.

The movement of said sleeve 32 is connected to that of each of the drums 29 through pinions 37 and 38 fixed in coaxial relation with each other. Pinions 37 mesh with toothed wheels 39 rigidly carried by the spindles of the respective drums, while pinions 40 mesh with a toothed wheel 40 integral with the top of sleeve 32.

Rotor 31 is driven through any suitable means, for instance through a shaft 41 and gears 42, 43, and 44.

Preferably, this device is completed by means such that when the winding up of the blades is finished drums 29 are automatically stopped.

These means are for instance so devised that, during the winding up of the blades, sliding member 36 is locked in a position in which dogs 35¹, 35² are not in engagement with one another. For instance a pin 45, carried by rotor 31 and adapted to pass through a slot 46 provided in member 36, carries a head 45¹ of larger width capable, in the aforesaid position, of entering a correspondingly widened portion 47 of sleeve 46.

Furthermore, the unlocking can be automatically obtained through means movable under the effect of the relative rotary movement of rotor 31 with respect to sleeve 32, which is stationary during the winding up of the blades, member 36 then coming back, under the action of a spring 48, toward a position in which said dogs are operatively engaged with one another.

These last mentioned means consist for instance of a nut 49 screwing upon a threaded portion of the outer periphery of sleeve 32 and adapted to slide in a groove 50 provided in rotor 31. At the end of the winding up, said nut pushes an inner projection carried by pin 45 (which is movable with respect to the rotor in a radial direction against the action of a spring 51). Therefore the head 45¹ of said pin is pushed out from its housing 47 and member 36 is released and can slide under the action of its spring 48.

The control of clutch 34 (which has been diagrammatically shown in the drawings and may be of any suitable type) and of sliding member 36, or in a general manner the control of any similar organs permitting to obtain the unwinding or the winding up of the blades may be either manual, as shown in Fig. 14, or automatic, depending in this case of certain conditions of working of the machine, for instance the speed thereof or the speed of revolution of the rotor. It may also be so devised as to be at will either manual or automatic.

A manual control will advantageously include (Fig. 14) a single lever 52, capable of acting both on member 36 and on clutch 34. For instance said lever is adapted to act on member 36 through an oscillating piece 53 cooperating with a rod 54 fixed to member 36 through a collar 55. A flexible element, such for instance as a leaf spring 56 is advantageously interposed between piece 53 and rod 54. Said spring is provided with an edge 56¹ with which a catch 57 can engage, said catch being rigid with a sliding handle 58 carried by lever 52.

Said lever 52 acts on the clutch 54 through any suitable means (not shown in the drawings) acting against the action of a spring 59 connected to lever 52 through a rod 60.

This device works in the following manner:

In order to cause the blades to be unwound, lever 52 is brought into position C for which, on the one hand, dogs 35¹ and 35² are not in engagement with one another and, on the other hand, sleeve 32 is not operatively connected with any of the parts. The centrifugal force causes the blades to unwind. In order to stop this movement it will suffice to release lever 52. This lever is then brought back into position A under the action of spring 48 of member 36, said member 36 being itself brought back into the position in which dogs 35¹ and 35² engage one another.

In order to wind up the blades, lever 52 is brought into position B, catch 57 being engaged with the edge of spring 56. In this position member 36 is fixed in position by means of its pin 45 and sleeve 32 is immobilized.

The blades are then wound up on their respective drums and nut 49 moves toward said pin 45 until it comes into contact with the inner head thereof, thus producing the unlocking of member 36. Said member is suddenly brought into the position thereof that corresponds to the engagement of the respective dogs 35¹ and 35² together. In the course of this movement, spring 56 is deformed and releases handle 58 so that lever 52 automatically comes back into position A, which is fixed by a stop 61.

The various devices above described would also apply the thick wings inflated with air of the kind of those described in the first part of this specification. In this case, means must be provided for permitting the injection of air into the blades in combination with the means for winding up or unwinding the blades.

For instance, as shown in Fig. 19, if the blades are wound up around drums 29, I may provide in each drum 29 orifices 29⁰ suitably disposed, the ends of the envelope being fixed in a fluid tight manner to said drum.

Figure 18:
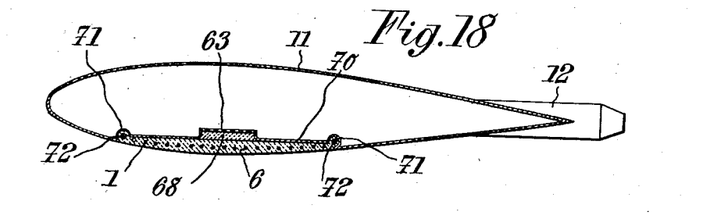
Fig. 18 is a cross sectional view of a foldable blade of the same type, corresponding to another embodiment.

A similar arrangement may be employed may be used when frameworks I are wound around drums 23 independently of the envelope, as shown for instance in Figs. 17 and 18.

According to this embodiment air under pressure is fed into a fluidtight box 62 through which at least one blade can pass in a fluidtight manner, said box containing the corresponding drum or drums 23. Air can enter the envelope of the blade, while the latter is passing inside box 62, by means of openings 63 provided in said envelope, said openings being subsequently stopped in a fluidtight manner by the framework, which is applied with a fluidtight fit against the outer face of said envelope.

The blade enters and leaves box 62 through packing means 64 and 65 preventing the compressed air in said box from escaping past the walls of said box. On the side of the hub, the envelope passes between two deformable rollers 66 pushed toward each other by springs 67.

Advantageously, framework I carries a suitable plastic material 6 provided with a band of a compressible material 69 (Fig. 18) so arranged that said band is applied against openings 63 of the envelope and stops said openings.

Furthermore, the blade, when issuing from box 62, is caused to pass between rollers 69.

In order to have the framework I to fit against the envelope with a sufficient amount of safety, said envelope is advantageously provided, along the edges of the housing 70 that is to receive the framework, with grooves 71 along which the framework and the envelope may be secured together, for instance on cables 72, which may at will be a part of framework 1 but which should preferably, in any case, be fixed to transverse member 3.

The systems of revolving blades above described may be used in place of systems of revolving blades as are used at the present time on certain flying machines. This would have the advantage of making it possible to reduce, while in flight, the active length of the blades.

But I believe that it is much more advantageous to provide flying machines of a new kind characterized in that they include, on the one hand, a stationary supporting surface, which, preferably, cannot be varied, and, on the other hand, a supporting system of variable area, consisting of a system of revolving blades of the kind above described.

This arrangement would permit of obtaining for any particular condition of flying the best possible adjustment. For flying at high speed, the machine would be wholly, or nearly wholly, supported by the fixed surfaces used with the best possible angle of incidence, the blades of the revolving system being then partly or wholly folded up or wound up so as to produce but very little resistance.

On the contrary, when taking off or landing, either vertically or obliquely, the machine would be supported chiefly by the system of revolving blades, so as to permit of obtaining very small vertical or oblique speeds, the blades being then unwound or unfolded to the maximum amount possible.

For intermediate conditions, the variable supporting revolving surfaces would be modified in a suitable manner, preferably gradually, so as to obtain the maximum efficiency of the flying machine.

Preferably, the revolving system of blades is arranged in such manner that its revolution is always maintained through any suitable means, even when the blades are wholly or partly wound up or folded up. This is intended to ensure, under the effect of the centrifugal force, a quick unwinding or unfolding of the blades under any conditions.

Preferably, the revolving movement to be maintained while the machine is flying normally is obtained by allowing a portion of the blades, which is not folded up or wound up, to rotate freely. This portion of the blades may be very small because the speed of self revolution of the blades increases, as the active portion of the blades is reduced. This operation can be obtained with an arrangement such for instance as that of Fig. 14 by adjusting the respective positions of nut 49 and pin 45 in such manner that the blades, in the neutral position, are not wholly folded up.

Figure 22:
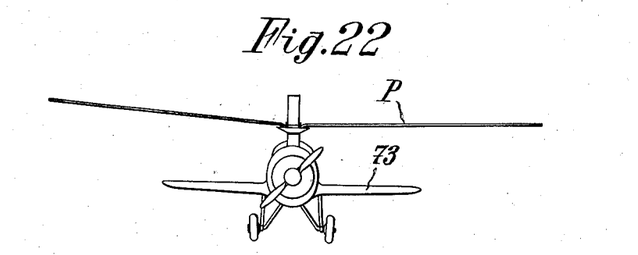
Fig. 22 is an elevational view of an airplane according to the present invention including fixed wings and rotary wings having supple and expansible blades.
Figure 23:
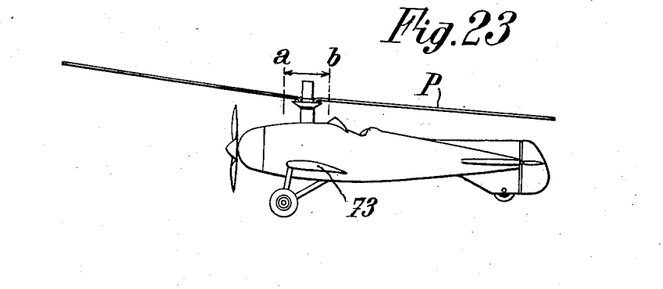
Fig. 23 is a side view corresponding to Fig. 22.

In Figs. 22 and 23 I have shown a flying machine including a fixed wing 73 and a revolving system of blades P the active length of which may be varied.

When said blades are wholly unwound they facilitate the taking off of the machine, whether they turn freely, as the blades of a wind engine, or they have their revolving movement helped by compressed air escaping from said blades, or they are positively driven, at least when taking off, by the engine.

Besides the taking off of the flying machine may take place by causing said machine to roll on the ground, the blades being unfolded only when the machine has moved a certain distance. The lift produced by the unfolding of the blades facilitates the taking off.

The distance on which the machine runs in this case may be very small owing to the very small resistance of the blades when folded up. Therefore the acceleration of the machine running on the ground is very high. Furthermore, the lift produced when the blades are unfolded makes it possible to take off at a great angle and therefore from places surrounded by obstacles.

After taking off, the diameter of the revolving system is gradually reduced until the speed of the machine is sufficiently high for permitting it to be supported without danger by wing 73, the angle of incidence of which corresponds advantageously to the best possible ratio of the lift and drag components. The diameter of the revolving system is then reduced to a very small value, such as $ab$. The speed of the flying machine can thus be considerably increased, the load per square meter being, in this case very high, for instance several hundreds of kilogrammes. The speed of revolution of the blades rotating freely becomes very high but as their diameter and their angle of incidence are very small, their resistance is not considerable.

If the flying machine is placed under dangerous conditions of flight, due for instance to a bad working of the engine, the release of the blades will cause them to unfold instantaneously, owing to the considerable centrifugal force acting thereon because of their high speed of revolution.

If the pilot desires to reach high altitudes or to fly at reduced speed he causes the revolving system to unfold.

Also, when landing, the blades may advantageously be unfolded for braking the movement of the machine, and if the diameter of the revolving system is sufficient, the machine will land vertically.

It should be noted that when the rotary movement of the rotor is made use of for producing the unfolding and the folding up of the blades, and especially the latter operation, power is taken from the living force of the rotor. If the unfolding or folding operation is rapid, there is a risk of the unfolded blades stalling and oscillating with an amplitude which may be dangerous.

This drawback may be avoided by storing up a supplementary amount of energy in a fly-wheel rigid with the rotor and turning advantageously at a high speed owing to the provision of a suitable transmission gear. The energy of this flywheel may be used for facilitating taking off and landing, as it will now be explained.

When starting, the blades being folded up, it is possible to cause the rotor and the fly-wheel to race. When the blades are unfolded, the rotor, the speed of revolution of which is reduced receives an important portion of the energy of the fly-wheel, and therefore keeps turning at a sufficient speed. Besides, the fly-wheel keeps a sufficient reserve of energy for transmitting a portion thereof to the rotor when the blades are folded up.

When the blades are folded up while the machine is flying, a portion of said blades is left unfolded so as to impart a high speed of revolution to the fly-wheel. However, if it were necessary to limit this speed, an automatic clutch would be provided between the fly-wheel and the rotor, so as to cut off the connection beyond a certain speed.

According to another feature of the present invention, a flying machine is provided with at least one revolving system having blades of variable active length, said system being so mounted on the machine that its hub may occupy different positions, whereby it is, for instance, possible to make use of this system either for supporting the machine or for propelling it.

Figure 24:
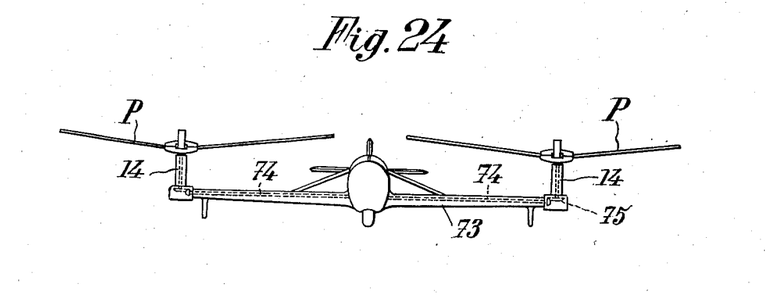
Figs. 24 and 25 are views, similar to Figs. 22 and 23 respectively, of another embodiment.
Figure 25:
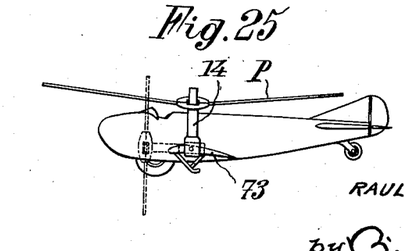

In Figs. 24 and 25 I have shown a flying machine provided with two revolving systems of blades P, adapted to turn, preferably, in opposite directions. These systems are disposed respectively at both ends of the stationary wing 73. Said wing may act as a support for transmissions such as 74, and pinions 75, which transmit the movement of the engine, preferably through a speed reducing gear to the hubs 14 of the revolving systems. The flying machine is then capable of taking off vertically owing to its revolving systems of blades which are unfolded and driven at reduced speed by the engine. When the speed of translation of the machine has become sufficient for permitting it to be supported merely by its fixed wing (for instance after a gliding flight along an oblique path) the diameter of the revolving systems may be reduced and their hubs are inclined horizontally, whereby said revolving systems, which are now advantageously driven at higher speed, owing to the gear box, act as propellers.

According to another arrangement, means are provided for varying the angle of incidence of the blades, either simultaneously for all the blades and advantageously according to the diameter of the circle swept over by said blades, or differentially. In the first case when the revolving systems serve to support the flying machine it is possible to give the blades the angle of incidence that is better adapted to correspond to the conditions of flight for taking off or landing, either vertically or obliquely.

On the other hand when the angles of incidence of the blades are varied in a differential manner, it is possible to produce torques transmitted to the body of the flying machine, so as to permit of controlling the position and the direction of flight of the machine, the revolving machines exerting, in this case, a stabilizing action.

In order to act simultaneously on the blades, it is, for instance, possible, as shown by Fig. 20, to give blades P a thickness and an inclination which vary along their length, so that their guiding on drums such as 16 and 23 gives said blades, due to their inclination on said drums, an incidence which varies according to the diameter to which they have been unfolded.

In particular when moving down in a vertical direction, I may provide, for the last part of the movement, a small length of the blades which is not unfolded and which is provided with an additional thickness which is adapted to give the blades a great angle of incidence so as to transform the kinetic energy stored up by the revolving system into a vertical lift.

In order to make it possible to control the direction and path of travel of the flying machine, according to the various conditions of flying, and especially when gliding, either vertically or obliquely, with the engine stopped, it is possible to create torques in different azimuths by creating variations of incidence such that the maximum of incidence corresponds to an azimuth in which it is desired to obtain a greater lift.

However the torques transmitted to the body of the flying machine through this means are generally rather small due to the fact that the blades can move freely in the vertical direction under the influence of a greater or smaller lift.

A particularly interesting embodiment is shown in Fig. 21. The principle of this arrangement consists in causing a member carried by the machine and capable of moving differentially on the blades to act on said blades close to the place where they are connected to the hub. This member consists, in the embodiment of Fig. 21, in a disc-shaped piece 77 rotating together with rotor 14, with which it is connected through a ball and socket joint 78, 79 and 80. Element 80 is guided in the hub through grooves 81. A rod 82, connected with element 78 through a ball bearing 83 permits of giving disc 77 any desired inclination and also of moving upwardly or downwardly.

By moving the plane of disc 77 I move the mean plane of rotation of the blades and I can therefore modify the relative position of the flying machine.

It should be well understood that the idea of causing revolving systems having blades of variable surface to exert a stabilizing action is hereby claimed in its most general scope and for all kinds of aircrafts, even different from those above described, for instance for lighter-than-air aircrafts, and especially airships.

Besides, instead of acting on the incidence, I might proceed in any other manner for obtaining the desired stabilization, for instance as follows:

In the example of Figs. 24 and 25, it is possible, by differentially varying the diameter of the two lateral supporting systems, to produce a torque capable of modifying the lateral inclination of the aircraft. By providing such an aircraft with a third revolving system disposed at the front or rear part of the fuselage it would be possible to produce a variable longitudinal torque for varying the inclination of the aircraft in the fore and aft direction thereof.

Such a system of stabilization including a plurality of supporting systems having blades of variable area would be particularly useful in the case of large size aircrafts, such for instance as airships.

According to still another feature of the invention, the revolving system of blades having a variable area is used as a parachute, this function being eventually combined with one or several of those above referred to (sustentation, propulsion, stabilization).

For this purpose, a portion of the aircraft, preferably a portion which can be easily detached from the remainder of said aircraft, for instance cabin 84 (Figs. 26 and 27) is provided with a rotor having foldable blades. These blades are normally folded up in a rotary hub 14, the rotation of which is, for instance, maintained by the free revolution of blades that are not folded up.

Figure 26:
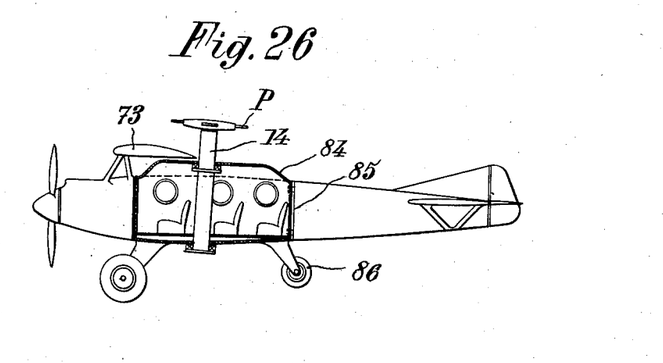
Fig. 26 is a side view of an airplane the cabin of which can be detached, made according to the present invention.
Figure 27:
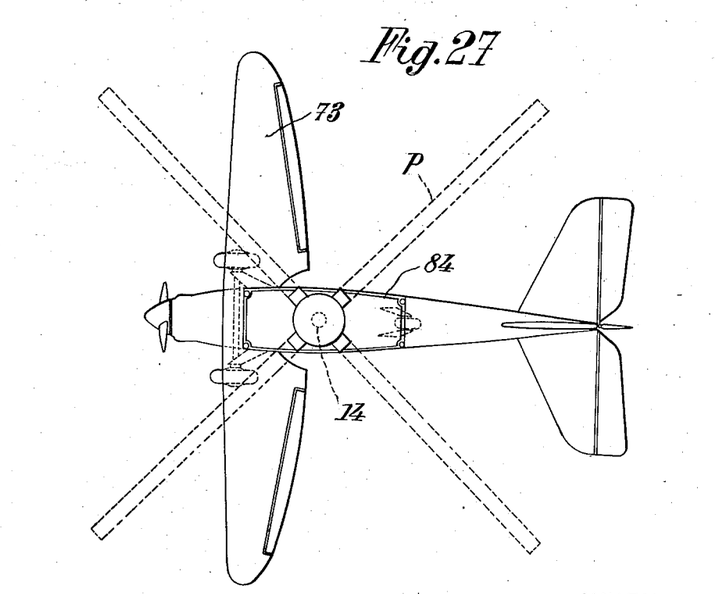
Fig. 27 is a plan view of the airplane shown by Fig. 26.

Under normal conditions of taking off, flying and landing, the rotor may act as above described. In case of danger, the cabin can be detached, sliding along guides such as 85. Wing 73 may be cut away so as to afford passage for the elements of the revolving system when folded up. Advantageously, the cabin carries the landing gear provided for instance with elastically suspended wheels 86 and with shock absorbing means, or it may be provided with distinct shock absorbing means.

Of course, certain other organs can be provided with parachutes of this kind, and eventually the passengers themselves individually.

This system of parachute may be applied to all kinds of aircrafts, and especially lighter-than-air aircrafts. In this case, the revolving systems to be used eventually as parachutes may normally serve to increase the ascensional power of the aircraft by turning in the same manner as a wind engine under the influence of atmospheric winds, or under the influence of relative wind in the case of dirigibles.

The possibility of varying the diameter of the blades of said revolving systems permits of modifying ascensional power of the aircraft without making use of ballast, which can therefore be dispensed with or reduced, so that the load carried by the airship can be considerably increased.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A system of the type described which comprises, in combination, a rotary hub and a plurality of blades carried by said hub, each blade including a rigid transverse member at the free end thereof, a plurality of cables fixed at one end to said member and at the other end to said hub, and a supple structure associated with said cables for forming the blades, comprising an envelope associated with said system of cables, and a plastic material filling said envelope for giving it the desired shape.

2. A system of the type described which comprises, in combination, a rotary hub and a plurality of blades carried by said hub, each blade including a rigid transverse member at the free end thereof, a plurality of cables fixed at one end to said member and at the other end to said hub, an envelope associated with said system of cables, and a fluid under pressure inflating said envelope for giving it the desired shape.

3. A system according to claim 2 further including means for continuously feeding said fluid under pressure into said envelope, and outlet means for allowing said fluid to escape from said envelope.

4. A system of the type described which comprises, in combination, a stationary part, a hub journalled in said part, a plurality of blades supple in the direction of their length adapted to slide at their inner end longitudinally in said hub in a direction parallel to the axis thereof, and means for pulling said blades more or less inside said hub.

5. A system of the type described which comprises, in combination, a stationary part, a hollow hub journalled in said part, rollers carried by the edge of said hub in opposite diametral positions, two blades made of a common band of a supple material passing around said rollers, so that the central portion of said band extends inside said hub, a pulley about which said central portion of the band is wound, and means for moving said pulley axially inside said hub.

6. A system of the type described which comprises, in combination, a stationary part, a hollow hub journalled in said part, rollers carried by the edge of said hub, a blade supple in the direction of its length, passing around each roller, means for fixing the inner end of each blade to said stationary part, a pulley in said hub around which passes the portion of said band between the inner end thereof and the part that passes over said roller, and means for moving said pulley axially inside said hub.

7. A system of the type described which comprises, in combination, a stationary part, a hub adapted to rotate in said part, a plurality of drums journalled on said hub, a sleeve coaxially mounted with respect to said hub and rotatable with respect to both said stationary part and said hub, means for interconnecting the rotary movement of said sleeve with respect to said hub with the rotary movement of said drums with respect to their axes, means for causing said sleeve to rotate together with said hub, means for disconnecting said sleeve from with said hub, and means for fixing said sleeve with respect to said stationary part.

8. A system according to claim 7 which further comprises, in combination with said means, means for automatically connecting said hub with said sleeve so as to cause these two parts to rotate together, when a predetermined length of each blade has been wound around its respective drum.

9. A system according to claim 7 further including manual means for controlling the three last mentioned means.

10. A system of the type described which comprises, in combination, a rotary hub, a plurality of blades supple in the direction of their length movably carried by said hub so as to project more or less from said hub, each blade including a frame work deformable in the direction of the length of the blade but adapted to resist tensile stresses in said direction, and a hollow envelope of a fluidtight matter adapted to be associated with said framework, a roller around which said envelope passes, another roller for said framework, a fluidtight box provided with holes for the passage of at least one blade, said box surrounding the second mentioned roller, a conduit for feeding air under pressure into said box, said envelope being provided with holes through which air under pressure is injected into the portion of the envelope that is located inside said box, and a band of compressible material carried by said framework adapted to stop said holes when said framework is associated with said envelope.

11. A system of the type described which comprises, in combination, a rotary hub, a plurality of blades supple in their longitudinal direction movably carried by said hub so as to more or less project radially therefrom, and a disc-shaped member rotatable together with said hub movable in all directions with respect to the axis of said hub and engageable with the blades, so as to vary the incidence of said blades in certain azimuths.

12. A system of the type described including, in combination, a rotary hub and a plurality of blades carried by said hub, each blade including a rigid transverse member at the free end thereof, a plurality of cables fixed at one end to said member and at the other end to said hub, a plurality of cables extending in the transverse direction of the blade and interconnected with the first mentioned cables, for ensuring a certain rigidity of the blade in the transverse direction thereof, and a supple structure associated with said cables for forming the blade.

13. A flying machine comprising a fixed surface sufficient alone to sustain the machine during normal flight, a motor, a rotating wing, means for selectively connecting said rotating wing to said motor to drive said rotating wing thereby for ascent, said rotating wing being capable of being driven in auto-rotation when disconnected from the motor by movement of the machine through the air, means independent of the motor operable during flight to vary the length of said rotating wing, and means to limit the decrease in length of said rotating wing so that the same always presents a surface sufficient to maintain it in auto-rotation.

14. In a device as claimed in claim 13, means operable during flight to vary the pitch of said rotating wing.

15. A flying machine comprising a fixed surface sufficient alone to sustain the machine during normal flight, a motor, a rotating wing, said rotating wing comprising a plurality of blades of variable length and a rotary member, a motor, means for selectively connecting said rotary member to the motor, means to vary the length of said blades, said means being connected to said rotary member so as to be actuated by the latter independently of said motor, whereby the energy necessary to extend or to withdraw the blades during flight is taken from the kinetic energy of said rotary member, and means to limit the withdrawal of the blades so that the latter present, in their neutral position, a sufficient aerodynamic surface to assure their rotation by the relative wind during flight.

16. In a machine according to claim 15, a fly wheel connected to said rotary member.

17. In a machine according to claim 15, independent stabilizing means on the stationary wing and on the rotating wing respectively.

18. A flying machine comprising a stationary wing and at least one rotating wing, said rotating wing having blades, means to vary the effective surfaces of said blades, and means to limit the action of said last means so as to maintain at all times a portion of the surfaces of said blades effective of sufficient area that during flight said rotating wing is always maintained in rotation, said machine having a portion capable of being released from the remainder of the machine, said rotating wing being connected to said releasable portion to act as a parachute therefor.

19. In a flying machine comprising at least one fixed aerodynamic surface capable, with a forward drive propelling system, of sustaining the machine in normal flight under conditions approximating the optimum ratio between the lift and drag components, the combination of a flexible extensible rotatable wing capable of adding its own lift to that of the fixed aerodynamic surface for ascent and for landing, and means for regulating, at least partially, the flexibility thereof during normal flight and the extension thereof for ascent and landing.

20. In a flying machine comprising at least one fixed aerodynamic surface capable, with a forward drive propelling system, of sustaining the machine in flight, a rotatable wing system with wings having a flexible part and a rigid part, the rigid part being sufficient to maintain said wing system in rotation, and means for regulating, at least partially, the flexibility of said wings during normal flight and extension thereof for ascent and landing.

21. In a flying machine comprising at least one fixed aerodynamic surface capable, with a forward drive propelling system, of sustaining the machine in normal flight, in combination, a motor, a flexible wing capable of being driven by said motor or by relative wind action, and means to regulate at will, at least partially, the flexibility of said wing during normal flight and extension thereof for ascent and landing.

22. In a flying machine comprising at least one fixed aerodynamic surface capable, with a forward drive propeller system, of sustaining the machine in normal flight, in combination, an extensible lifting wing system including wings, said wings being at least partially flexible, and means for controlling the flexibility of said wings for normal flight and for extending the same for ascent and landing, said last named means being connected with the lifting system so as to obtain therefrom kinetic energy for extending or retracting said wings.

23. An aircraft supporting rotor vane consisting of a hub; of multiple air tight envelopes, fabricated to airfoil rotor shape, reinforced to resist centrifugal and lifting stresses the open ends of the envelopes being adapted and arranged to be attached at a positive angle of incidence to the hub which rotates when in action; and means to inflate the envelopes while so attached and while in action.

24. Horizontal safety rotors for aircraft comprising in combination, furled packs of multiple bladed pneumatic reinforced rotors adapted and arranged to lower or land aircraft; means to rotate the rotor-blade packs; and means to unfurl the rotor-blade packs and inflate the rotor-blades while they are rotating.

25. An aircraft supporting rotor comprising in combination a rotor-head provided with flexible pneumatic rotor-blades; weighted means fixed to the inflated rotor-blades to produce by means of centrifugal force the proper rigidity and shape when the rotors are in circular motion.

26. The combination of an aircraft supporting rotor; with resilient pliable pneumatic rotor-blades adapted and arranged to be furled into a pack and concealed when not in use and means to unfurl and inflate when in use.

27. An aircraft supporting rotor vane comprising in combination a rotor-shaft, a rotor-head with multiple flexible pneumatic rotor-blades fixed to the rotor-shaft; the rotor-blades adapted and arranged for support of the aircraft; and means to deflate and furl the rotor-blades into a rotor-pack while the rotor blade pack, the rotor-head and rotor-shaft are rotating.

28. An aircraft supporting rotor consisting of a hub with resilient airtight rotor blades set at a positive angle of incidence; means to rotate the hub and rotor blades and means to inflate the rotor blades while they are rotating.

29. An aircraft supporting rotor consisting of a hub; of multiple collapsible rotor blades fixed to the hub at a positive angle of incidence adapted and arranged to rotate when in action while the rotor blades are collapsed; and means to release and project the rotor blades from the hub after the hub is rotating.

30. An aircraft supporting rotor pack consisting of a hub, of multiple flexible rotor blades fixed to and collapsed around the hub; means to rotate the hub and rotor blade pack while collapsed; and means to release and project the collapsed rotor blades from the hub while the hub and rotor blades are rotating.

31. A horizontal flexible aircraft rotor, consisting of a hub with a resilient pneumatic rotor blades adapted and arranged for vertical lift while taking off or landing; and cable means attached to the rotor blades for rolling the rotor blades into a rotor pack while the rotor is in circular motion.

32. An aircraft rotor shaft; a rotor head fixed to the rotor shaft provided with multiple flexible rotor blades; rotor blade furling means fixed to the rotor blades, cooperating with rotor blade furling means attached to the rotor head, for rolling the rotor blades into a rotor pack.

33. A rotor shaft; a rotor sleeve; a rotor pack consisting of multiple furled rotor blades; means to operate the rotor shaft and rotor sleeve at the same speed while the rotor is unfurled and rotating; means for reducing the speed of the rotor sleeve in relation to the speed of the rotor shaft for furling the rotor blades; and means to rotate the rotor sleeve at a faster speed than the rotor shaft while the rotor blades are being unfurled.

34. A hollow rotor shaft; a rotor head with multiple pneumatic rotor blades rolled inside a rotor pack fixed to the hollow rotor shaft, air or gas supply connected to the hollow rotor shaft; and means for injecting air or gas into the furled rotor blade pack through the hollow rotor shaft, while the hollow rotor shaft, the rotor head and rotor pack are rotating and the rotor blades are unfurling from the rotor pack.

35. An aircraft supporting rotor vane, comprising in combination, a rotor shaft, a rotor head with multiple flexible rotor blades, the rotor blades rolled into a rotor pack; rotor shaft power mechanism adapted and arranged to rotate the rotor shaft, rotor head and rotor pack; means to unfurl the rotor pack into rotor blades after the rotor shaft, rotor head and rotor pack are rotating; and means to inflate the rotor blades while the rotor blade pack is rotating and being unfurled.

36. An aircraft supporting rotor vane, comprising in combination, a rotor shaft, a rotor head with multiple flexible pneumatic rotor-blades, fixed to the rotor shaft; the rotor blades while in circular motion adapted and arranged for support of the aircraft; and means to deflate and furl the rotor blades into a rotor pack, while the rotor blade pack, the rotor head and rotor shaft are rotating.

37. An aircraft rotor vane consisting of a rotor head with multiple pneumatic rotor blades; cable furling and centrifugal weight means fixed near the outer tips of the rotor blades, used for the dual purpose of furling the rotor blades and placing the desired weight for centrifugal pull near the outer ends of the rotor blades while they are unfurled.

RAUL PATERAS PESCARA.